(12) United States Patent
Carapella et al.

(10) Patent No.: US 11,531,167 B2
(45) Date of Patent: *Dec. 20, 2022

(54) CONNECTORS FOR MICRO-DUCT TERMINATIONS OF FIBER OPTIC CABLE

(71) Applicant: PPC BROADBAND, INC., East Syracuse, NY (US)

(72) Inventors: Peter A. Carapella, Fayetteville, NY (US); Noah Montena, Syracuse, NY (US); William Crawford, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,247

(22) Filed: Mar. 2, 2021

(65) Prior Publication Data
US 2021/0278608 A1 Sep. 9, 2021

Related U.S. Application Data

(63) Continuation of application No. 16/519,871, filed on Jul. 23, 2019, now Pat. No. 10,935,734, which is a (Continued)

(51) Int. Cl.
*G02B 6/38* (2006.01)
*G02B 6/44* (2006.01)

(52) U.S. Cl.
CPC ............ *G02B 6/3825* (2013.01); *G02B 6/387* (2013.01); *G02B 6/3888* (2021.05);
(Continued)

(58) Field of Classification Search
CPC ............................. G02B 6/4446; G02B 6/387
See application file for complete search history.

(56) References Cited

U.S. PATENT DOCUMENTS 5,224,187 A  6/1993  Davidson
5,371,827 A  12/1994  Szegda
(Continued)

FOREIGN PATENT DOCUMENTS

DE    2754055 A1  4/1979
DE  202012006558 U1  10/2012
(Continued)

OTHER PUBLICATIONS

Search Report dated May 6, 2016 in corresponding International Application No. PCT/US2016/019664, 2 pages.
(Continued)

*Primary Examiner* — Sung H Pak
(74) *Attorney, Agent, or Firm* — MH2 Technology Law Group LLP

(57) ABSTRACT

A connector for coupling a fiber optic cable with a connection point includes a connector body at a first end of the connector and extending in a longitudinal direction and a connector housing at a second end of the connector. The connector body defines a first longitudinal conduit configured to receive a duct, and the duct is configured to slidingly receive the fiber optic cable. A compression fitting is configured to be received about a first end of the connector body and to slide relative to the connector body in the longitudinal direction to radially compress the first end of the connector body to grip the duct. The connector housing includes a second longitudinal conduit substantially aligned with the first longitudinal conduit in the longitudinal direction and a connection portion configured to couple the fiber optic cable to the connection point. The first longitudinal conduit and the second longitudinal conduit are configured to slidingly receive the fiber optic cable.

20 Claims, 13 Drawing Sheets

Related U.S. Application Data continuation of application No. 15/949,466, filed on Apr. 10, 2018, now Pat. No. 10,359,580, which is a continuation of application No. 15/054,121, filed on Feb. 25, 2016, now Pat. No. 9,946,036.

(60) Provisional application No. 62/241,134, filed on Oct. 13, 2015, provisional application No. 62/120,823, filed on Feb. 25, 2015.

(52) U.S. Cl.
CPC ......... *G02B 6/3897* (2013.01); *G02B 6/4446* (2013.01); *G02B 6/3816* (2013.01); *G02B 6/4441* (2013.01)

(56) References Cited

U.S. PATENT DOCUMENTS

| | | | |
|---|---|---|---|
| 6,053,639 | A | 4/2000 | Chen |
| 7,280,733 | B2 | 10/2007 | Larson et al. |
| 8,573,859 | B2 | 11/2013 | Larson et al. |
| 9,103,994 | B2 | 8/2015 | Jones et al. |
| 9,203,167 | B2 | 12/2015 | Holliday et al. |
| 9,239,433 | B2 | 1/2016 | Wild |
| 10,935,734 | B2 * | 3/2021 | Carapella ............ G02B 6/3887 |
| 2002/0159709 | A1 | 10/2002 | Faus |
| 2006/0165352 | A1 | 7/2006 | Caveney et al. |
| 2008/0253719 | A1 | 10/2008 | Kachmar |
| 2012/0106912 | A1 | 5/2012 | McGranahan et al. |
| 2014/0328560 | A1 | 11/2014 | Ahmed et al. |
| 2020/0012062 | A1 | 1/2020 | Kirkpatrick |

FOREIGN PATENT DOCUMENTS

| | | |
|---|---|---|
| EP | 2317357 A1 | 5/2011 |
| GB | 1588739 A | 4/1981 |

OTHER PUBLICATIONS

Written Opinion dated May 6, 2016 in corresponding International Application No. PCT/US2016/019664, 7 pages.

International Preliminary Report on Patentability dated Aug. 29, 2017 in corresponding International Application No. PCT/US2016/019664, 8 pages.

European Office Action dated Oct. 20, 2020 in corresponding European Patent Application No. 16756403.8, 8 pages.

Australian Examination Report dated Jul. 15, 2020 in corresponding Australian Patent Application No. 2016222612, 5 pages.

Canadian Examiner's Report dated Feb. 22, 2022 in corresponding Canadian Application No. 2,977,278, 4 pages.

* cited by examiner

CONNECTORS FOR MICRO-DUCT TERMINATIONS OF FIBER OPTIC CABLE

CROSS-REFERENCE TO RELATED APPLICATIONS

This is a continuation of U.S. application Ser. No. 16/519,871, filed Jul. 23, 2019, pending, which is a continuation of U.S. application Ser. No. 15/949,466, filed Apr. 10, 2018, now U.S. Pat. No. 10,359,580, which is a continuation of U.S. application Ser. No. 15/054,121, filed Feb. 25, 2016, now U.S. Pat. No. 9,946,036, which claims benefit of both U.S. Provisional Application No. 62/120,823, filed Feb. 25, 2015 and U.S. Provisional Application No. 62/241,134, filed Oct. 13, 2015. The disclosure of the prior applications is incorporated by reference herein in its entirety.

BACKGROUND

Optical fiber systems are increasingly used in a variety of communications applications, including voice, video, and data transmissions, because they offer a high bandwidth for signal transmission, low noise operation, and inherent immunity to electromagnetic interference. Such systems typically require connections of optical fibers at various points in the network. For example, connection points are commonly needed to (i) connect individual optical fiber cable lengths to create a longer continuous optical fiber, (ii) create branching points that reroute fibers in the same cable in different directions as needed to provide fibers at desired locations, and (iii) connect active and passive components of the system.

Optical fibers used for voice, data, and video transmission typically include a glass core, where the majority of the light signal travels, and a surrounding glass cladding, which serves as a waveguide to keep the light traveling axially in the core. The glass core and cladding are surrounded by one or more protective coatings, for example, polymeric coatings, which offer mechanical protection to the underlying glass cladding and glass core. The inner coating is typically a softer, relatively low modulus polymeric material selected to buffer the glass cladding and core from mechanical stresses. The outer coating is typically a higher modulus material that provides mechanical protection while facilitating handling of the optical fiber over the cabling, installation, and operating life of the optical fiber. Additional intermediate coatings may be included as desired. The overall cross-section of the optical fiber will thus be significantly bigger than the glass core and glass cladding.

Conventionally, optical fiber connections are made by (i) fusion splicing where two ends of the optical fibers are welded together at glass contact points (and a protective sleeve placed over the weld point); (ii) mechanical splices where the two ends of fibers being joined are coupled together with a mechanical apparatus; or (iii) mechanical connectors where the two ends of fibers are coupled together with a mechanical connector. Fusion splicing and mechanical splicing are designed to he performed once, while a mechanical connector is designed to be connected, disconnected, and reconnected multiple times over the useful life of a connector while providing a high-quality, low-added-loss, low-optical-reflection joint between the connected optical fibers.

The continued surge in the market for high-bandwidth communication services/content to the home (e.g., high speed Internet access, cable television, high-definition television (HDTV), and video-on-demand) has created the need to reduce the costs and complexity of installing Fiber-to-the-Home (FTTH) networks. In order to expedite deployment and improve cost efficiencies of fiber optic system installations, plug-and-play items such as connectors, adaptors, converters, terminals, and pre-connectorized cables have been developed to accomplish lower cost and less complex FTTH networks. These plug-and-play items give service providers the ability to turn up service quickly, often without the need of a highly skilled splice technician. The cost of FTTH network deployment can be reduced by initially installing the feeder and distribution cables of the network and subsequently making connections from the distribution cable to the home with pre-connectorized drop cables. This also allows the cost of the last connection to be realized at the time the customer purchases the service (Internet access, cable television, HDTV, and video-on-demand).

A "drop cable" is typically designed for connecting one or more optical fibers from a larger network, outside a home or business, to a local network of a home or business. Each end of the drop cable requires an optical fiber connection, which is selected to mate with another connector. The mating ends of connectors may be installed onto the fiber ends either in the field (e.g., at the network location) or "pre-connectorized" in a factory prior to installation into the network. The advantage of installing the mating ends of the connectors in a factory is that the connector installation process can be made faster, less expensively, and with a higher quality in a manufacturing environment than in a field environment. For example, polishing and tuning procedures may be incorporated into optical connector manufacturing of connectors that are generally assembled onto optical fiber in a supplier's manufacturing facility.

Pre-terminated fiber cable assemblies can be provided with durable cable and hardened/weatherized connector ends that make it easy for an installer with little or no formal training to provision a customer drop. Examples of a hardened/weatherized connector include the OPTITAP™ brand connector, commercially available from Coming Cable Systems, and the DLX fiber optic connector system, commercially available from TE Connectivity. However pre-terminated drop cable assemblies require the selection and stocking of fiber optic cable product that exceeds the distance between the fiber tap and customer demarcation, therefore requiring the storage of slack cable length somewhere within the drop run.

It may be desirable to provide a drop cable assembly that minimizes the amount of slack to be stored within the drop run, while still providing an assembly that allows quick, easy, and secure attachment of a connector or fitting to either end of a drop cable so that the drop cable can be terminated to a device or housing.

SUMMARY

According to various aspects of the disclosure, a connector for coupling a fiber optic cable with a connection point includes a cable connector and a connector housing. The cable connector has a first longitudinal conduit configured to receive a duct, arid the duct is configured to slidably receive the fiber optic cable. The cable connector includes a connector body having a first end and a second end in a longitudinal direction, and a compression fitting configured to be received about the first end of the connector body and slidable relative to the connector body in the longitudinal direction to radially compress the first end of the connector body to grip the duct. The connector housing has a second longitudinal conduit substantially aligned with the first longitudinal conduit in the longitudinal direction. The connector housing includes a first end configured to be coupled with the second end of the connector body, and a second end having a connection portion configured to couple the fiber optic cable to the connection point. The first longitudinal conduit and the second longitudinal conduit are configured to slidably receive the fiber optic cable.

In some embodiments, the cable connector further includes a threaded nut rotatably coupled to the second end of the connector body, and the first end of the connector housing includes a threaded port configured to threadably receive the threaded nut. In some aspects, the cable connector and the connector housing are formed as a single piece of monolithic construction.

According to various aspects, an assembly includes the aforementioned connector, a fiber optic cable slidable relative to the cable connector and the connector housing, and a fiber optic connector terminating the fiber optic cable.

In another embodiment, a connector for coupling a fiber optic cable with a connection point includes a connector body at a first end of the connector and extending in a longitudinal direction and a connector housing at a second end of the connector. The connector body defines a first longitudinal conduit configured to receive a duct, and the duct is configured to slidably receive the fiber optic cable. A compression fitting is configured to be received about a first end of the connector body and slidable relative to the connector body in the longitudinal direction to radially compress the first end of the connector body to grip the duct. The connector housing includes a second longitudinal conduit substantially aligned with the first longitudinal conduit in the longitudinal direction and a connection portion configured to couple the fiber optic cable to the connection point. The first longitudinal conduit and the second longitudinal conduit are configured to slidably receive the fiber optic cable.

According to various aspects of the connector, the connector body and the connector housing are formed as a single piece of monolithic construction. In some aspects, the connector, a fiber optic connector is configured to terminate a fiber optic cable. The fiber optic connector is configured to be coupled with the connector housing in some aspects.

In some aspects, an assembly includes the aforementioned connector, a fiber optic cable slidable relative to the cable connector and the connector housing, and a fiber optic connector terminating the fiber optic cable. The assembly may comprise a bulkhead configured to receive the connector housing and to slidably receive the fiber optic cable.

According to another embodiment, a connector for coupling a fiber optic cable with a connection point includes a connector body, a compression fitting, a connector housing, and a fiber optic coupling. The connector body is disposed at a first end of the connector and extends in a longitudinal direction. The connector body defines a first longitudinal conduit configured to receive a duct, and the dirt is configured to receive the fiber optic cable. The compression fitting is configured to be received about a first end of the connector body and is slidable relative to the connector body in the longitudinal direction to radially compress the first end of the connector body to grip the duct. The connector housing is disposed at a second end of the connector and includes a second longitudinal conduit substantially aligned with the first longitudinal conduit in the longitudinal direction. The connector housing includes a connection portion configured to couple the fiber optic cable to the connection point. The first longitudinal conduit and the second longitudinal conduit are configured to slidably receive the fiber optic cable. The fiber optic coupling is at least partially received by the connector housing.

According to some aspects, the fiber optic coupling is coupled with the connector housing. The connector may include a fiber optic connector configured to terminate a fiber optic cable, wherein the fiber optic connector is received by the fiber optic coupling. In some aspects, the connector body and the connector housing are formed as a single piece of monolithic construction.

In various aspects, an assembly includes the aforementioned connector and a fiber optic cable terminated by the fiber optic connector. According to some aspects, the assembly may include a bulkhead configured to receive the connector portion of the connection housing. The bulkhead may be configured to receive a portion of the fiber optic coupling.

According to various aspects of the assembly, the fiber optic coupling may be configured to mate the fiber optic cable, which is disposed at a first side of the bulkhead, with a second fiber optic cable disposed at a second side of the bulkhead.

In some aspects of the assembly, a second fiber optic coupling may be configured to mate the fiber optic cable, which is terminated by the fiber optic connector, with a second fiber optic cable terminated by a second fiber optic connector.

DETAILED DESCRIPTION OF THE EMBODIMENTS

The following detailed description refers to the accompanying drawings. The same reference numbers in different drawings may identify the same or similar elements. Also, the following detailed description does not limit the invention.

Figure 1:
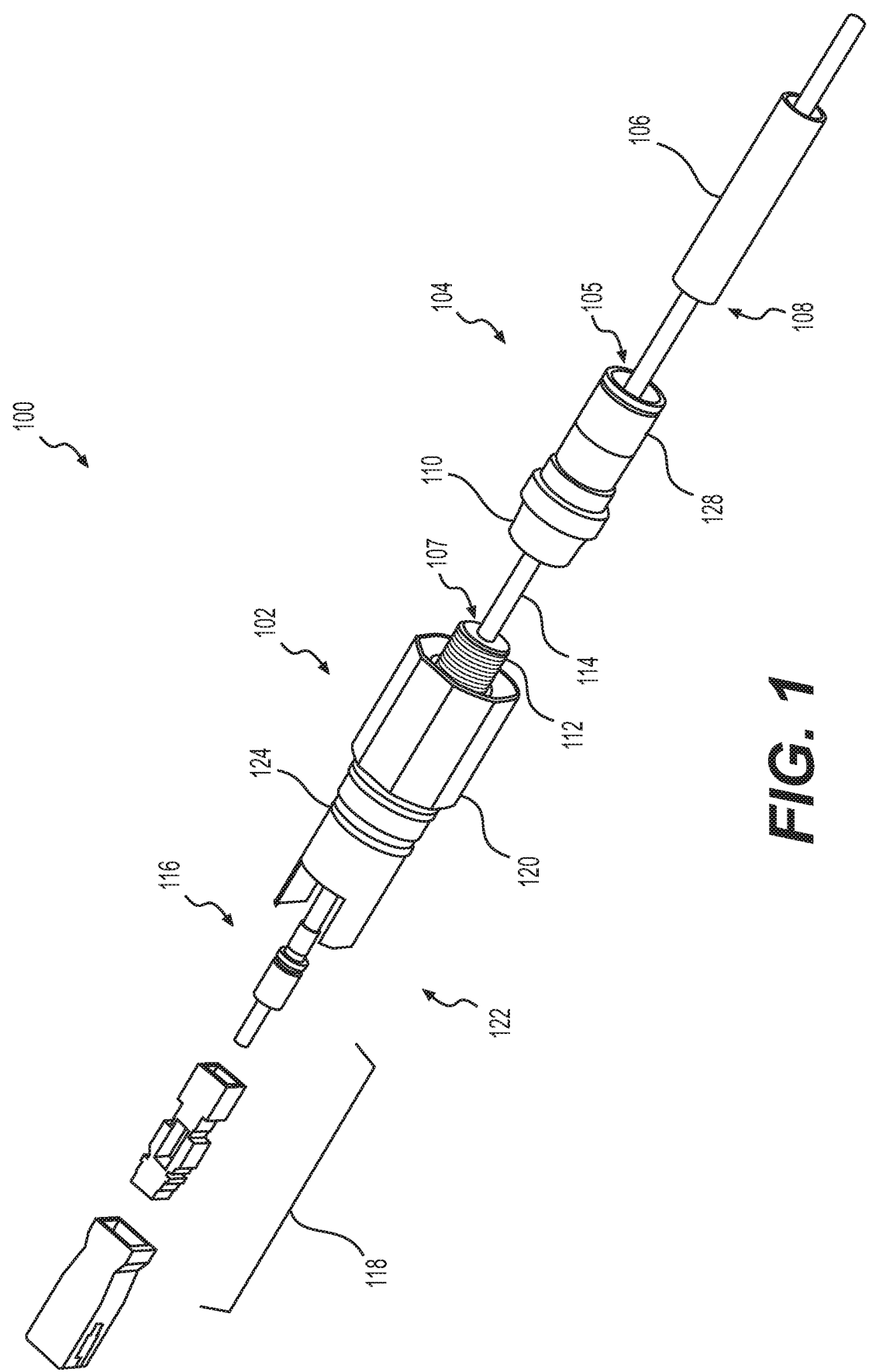
FIG. 1 is a partially-exploded isometric view of an exemplary feed-through connector in accordance with various aspects of the disclosure.
Figure 2:
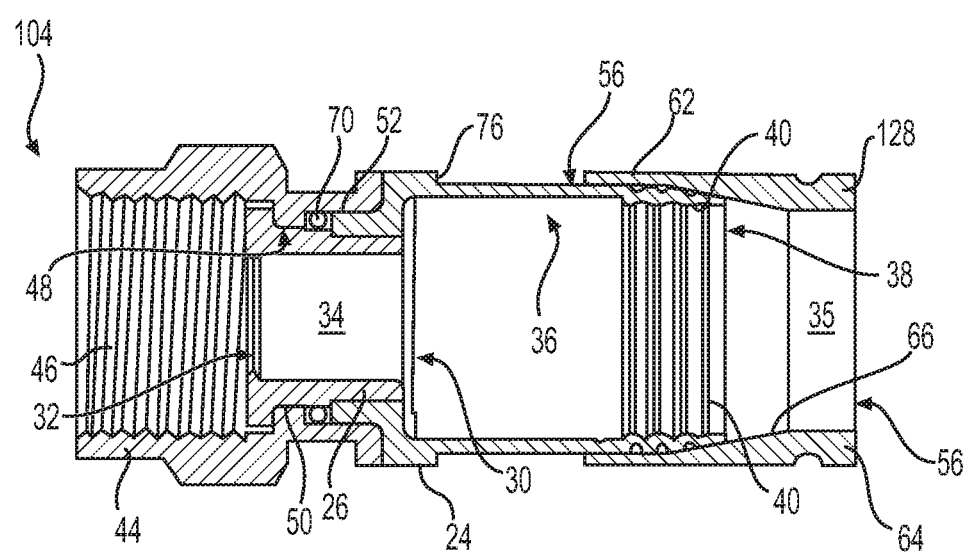
FIG. 2 is a cross-sectional view of an exemplary cable connector of the connector of FIG. 1 in a first configuration.
Figure 3:
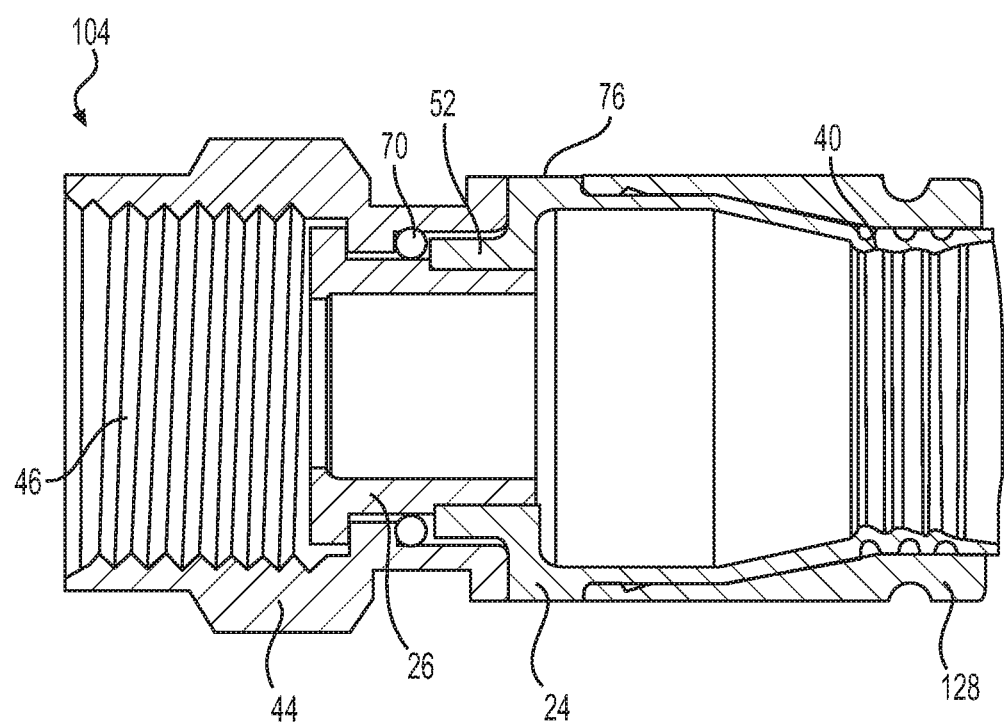
FIG. 3 is a cross-sectional view of an exemplary cable connector of the connector of FIG. 1 in a second configuration

Referring to FIGS. 1-3, a feed-through connector 100 in accordance with various aspects of the disclosure is illustrated. The connector 100 includes a connector housing 102 and a cable connector 104. The cable connector 104 may be, for example, a conventional coaxial cable "F-type" compression connector or any other conventional cable connector having a compression fitting 128. The compression fitting 128 of the cable connector 104 is sized to slidably receive a duct 106, for example, a micro-duct. The compression fitting 128 is configured to couple the cable connector 104 with the duct 106. The duct 106 may be sized such that the cable connector 104 can be installed on a free end 108 of the duct 106. For example, the duct 106 can be sized such that a conventional coaxial cable "F-type" compression connector can be installed on the free end 108 using existing field compression tooling. Such connectors and tools are presumed to be available to a typical communications systems installer and the procedures for installing the connector 104 on the end 108 are presumed to be familiar to the typical communications systems installer.

For example, referring to FIGS. 2 and 3, in one exemplary embodiment, the connector 104 has a first body member that includes a connector body or cylindrical body member 24, a coupling 26, and the compression fitting 128. The coupling 26 may be a tubular member having a first opening at a first end 30 and a second opening at a second end 32. Coupling 26 defines a first inner cavity or passageway 34. The inner surface of connector body 24 defines an outer cavity 36 accessible via an opening 38 at one end of the connector body 24. The outer cavity 36 is disposed radially outward of the first inner cavity 34. The outer cavity 36 is open at a first end of the connector body 24 and is closed at the other end or second end of connector body 24 together with coupler 26.

In some embodiments, the connector body 24 and the coupling 26 may be separate components wherein the connector body 24 is press fitted onto the outer surface of the coupling 26. According to various aspects, the connector body 24 can be formed of a metal or a plastic composition. In other embodiments, the connector body 24 and coupling 26 may be formed integrally as a single piece of monolithic construction.

In some embodiments, the inner surface or inner wall of the connector body 24 may have annular serrations 40. It should be appreciated that the annular serrations 40 of the connector body 24 may provide for a continuous environmental seal and grip on the duct when the compression fitting 128 is assembled to the duct.

As illustrated in FIG. 2, the cable connector 104 includes a nut 44 that is internally threaded as at 46 and is provided with a shoulder 48 at a first end seated in a groove 50 formed by the outer surface of the base of coupler 26 and a groove 52 of the connector body 24. The nut 44 and/or coupler 26 is rotatable relative to the connector body 24. An O-ring seal 70 can be seated in groove 52 at a first end of connector body 24 to serve as a moisture barrier.

Compression fitting 128 is shown in FIGS. 1-3 as being of a tubular configuration. The compression fitting 128 may be formed of metal and has a first opening 56 and a second opening 58 which define a second cavity or a central passageway 35 between the first and second ends of the compression fitting 128.

The compression fitting 128 includes a first inner bore or first end 62 having a first diameter, and a second inner bore or second end 64 having a second or reduced diameter which is less than the diameter of the first bore. A ramped surface or inwardly tapered annular wall 66 is provided between the first 62 and second 64 bores.

Although the compression fitting 128 can be coupled to the connector body 24 such that the compression fitting 128 can be removed by hand, in the embodiments illustrated in FIGS. 2 and 3, the compression fitting 128 is dimensioned and configured relative to the dimensions of the connector body 24 so that the compression fitting 128 is securely attached to the connector body 24. Such attachment can be obtained by a press fit assembly. In some aspects, as described in more detail below, the compression fitting 128 may include a latching member directed radially inward and configured to cooperate with a latching structure extending outward from an outer surface of the connector body 24. As described herein, the compression fitting 128 is movably coupled to the connector body 24 so as to be capable of being moved on the connector body 24 from a first preassembled configuration (FIG. 2) to a second assembled configuration (FIG. 3). Both the first inner bore 62 and the second inner bore 64 have diameters that are less than an outer diameter d of the portion of the connector body that accepts the compression fitting 128.

The second configuration, shown in FIG. 3, is achieved after the compression fitting 128 is axially moved along the connector body 24 to a second location on the connector body 24 such that the second inner bore 64 of the compression fitting 128 engages the outer surface of the connector body 24. As shown in FIG. 3, flange 76 on the connector body 24 is provided to engage the compression fitting 128 at its second configuration. In this preferred embodiment, flange 76 may be a tubular ring or a portion thereof as shown. Alternatively, however, flange 76 can be formed of one or more protrusions extending from the outer surface of the connector body 24 at one or more locations.

To assemble the cable connector 104 to a duct 106, the end 108 is inserted into the second end 64 of the compression fitting 128 and into the outer cavity of the connector body 24. Once the duct 106 is positioned, for example, to abut the coupler 26, the compression fitting 128 is then advanced or moved axially from its pre-installed first configuration to its second configuration, for example, by a conventional tool. As discussed above, in the preferred embodiment, the compression fitting 128 engages flange 76 of the connector body 24 in its second configuration. Since the diameter of the second inner bore 64 of compression fitting 128 is smaller than the diameter d, shown in FIG. 2, of the portion of the connector body 24 accepting the compression fitting 128, the connector body 24 is concentrically compressed so that the volume of the outer first cavity 36 is further decreased. That is, the connector body 24 is further displaced or moved radially inwardly. As a result, the outer portion of the duct 106 is firmly gripped or clamped by connector body 24. In this manner, the annular serrations 40 of the connector body 24 may provide a generally continuous, 360° seal and grip on the outer portion of the duct. This construction may eliminate the need for an O-ring or other seal between the connector body 24 and the compression fitting 128, and can accommodate a wide range of cable types and sizes. Thus, the need for connectors of various sizes can be avoided with a universal connector of the present invention.

Figure 13:
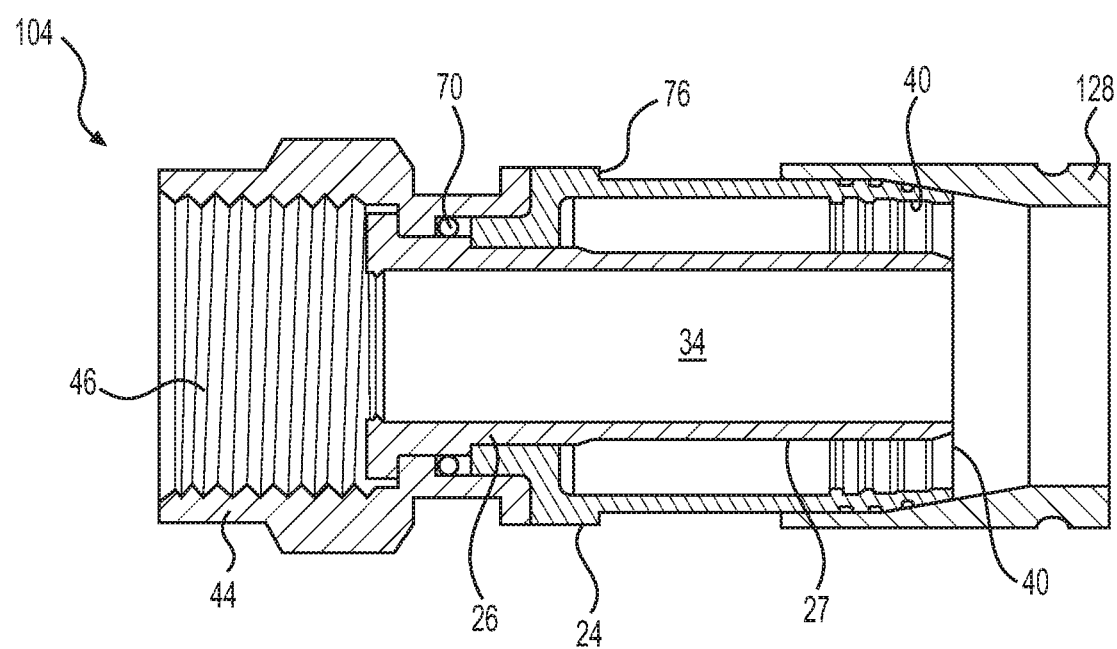
FIG. 13 is a cross-sectional view of another exemplary cable connector of the connector of FIG. 1.

Although FIGS. 2 and 3 illustrate a "post-less" cable connector 104, it should be appreciated that the cable connector 104 may be a conventional cable connector having a post 27, as illustrated in FIG. 13. One example of a conventional "F-type" compression connector is the EX® Series Universal Compression Connector, commercially available from PPC Broadband, Inc. It should be appreciated that an unmodified EX® Series coaxial connector can be installed on the end 108 of a conventional 8mm duct 106 using typical installer tools. The end 108 of the duct 106 can be inserted in the outer cavity 36 between the post 27 and the connector body 24 such that when the compression fitting 128 is moved axially from the first configuration to the second configuration, the duct 106 is gripped between the connector body 24 and the post 27 by the radial compression of the compression fitting 128.

Referring again to FIG. 1, the connector housing 102 may include a male-threaded first end 112 proximate the female-threaded nut 44. The cable connector 104 and the connector housing 102 are relatively rotatable such that the female-threaded nut 44 of the cable connector 104 and the male-threaded first end 112 can couple the cable connector 104 with the connector housing 102. It should be appreciated that the threaded arrangements can be reversed such that the cable connector 104 has a male-threaded first end and the connector housing 102 has a female-threaded first end.

The duct 106, the first longitudinal conduit 105, and the second longitudinal conduit 107 are sized to slidably receive an optical fiber cable 114. For example, the duct 106 may be a conventional 8 mm micro-duct having a 5.5 mm inside diameter, while the optical fiber cable 114 may be a commercially available fiber having a diameter of 3 mm. This allows the optical fiber cable 114 to be pushed through the duct 106 and/or pulled back through the duct 106. After being fed through, an end 116 of the optical fiber cable 114 can be terminated with an optical fiber connector 118. The optical fiber connector 118 may be an SC connector, an LC connector, an ST connector, or the like, which is selected depending on the connection to be made. In the exemplary embodiment of FIG. 1, the optical fiber connector 118 is an SC connector.

The connector housing 102 may include a weatherized or "ruggedized," shell 120 and a second end 122 opposite to the first end 112. The connector housing 102 may also include an O-ring 124 to provide a sealed connection with a connection point of a structure (not shown). The shell 120 and the second end 122 of the connector housing 102 may be designed to connect with a connection point of any commercially available connector system. For example, the connector housing 102 can be designed to connect with the OPTITAP™ brand connector system, the DLX fiber optic connector system, or any Open Device Vendor Association (ODVA) compliant connector system. The shell 120 of the connector housing 102 may be rotatable relative to the first end 112 and the second end 122 so that the connector housing 102 may be coupled to the connection point.

In use, a duct 106, such as a micro-duct, may be cut to a precise, desired length for a drop cable assembly between two connection points. A cable connector 104, such as a conventional, unmodified coaxial connector, is connected to either or both ends 108 of the duct 106. The cable connector 104 may include a compression fitting 128 that can be compression-fit to either or both ends 108 of the duct 106. A pre-terminated fiber optic cable 114 is fed through the duct 106, the first longitudinal passage 105 (defined by the first and second passageways 34, 35) in the cable connector 104, and a second longitudinal passage 107 extending through the connector housing 102. The connector housing 102 and the coaxially connector 104 may be coupled to one another before or after the pre-terminated fiber optic cable 114 is fed through the duct 106. Regardless, the pre-terminated fiber optic cable 114 can be snapped into place in an ODVA connector so that the fiber optic cable 114 can be terminated to a device or housing.

Figure 4:
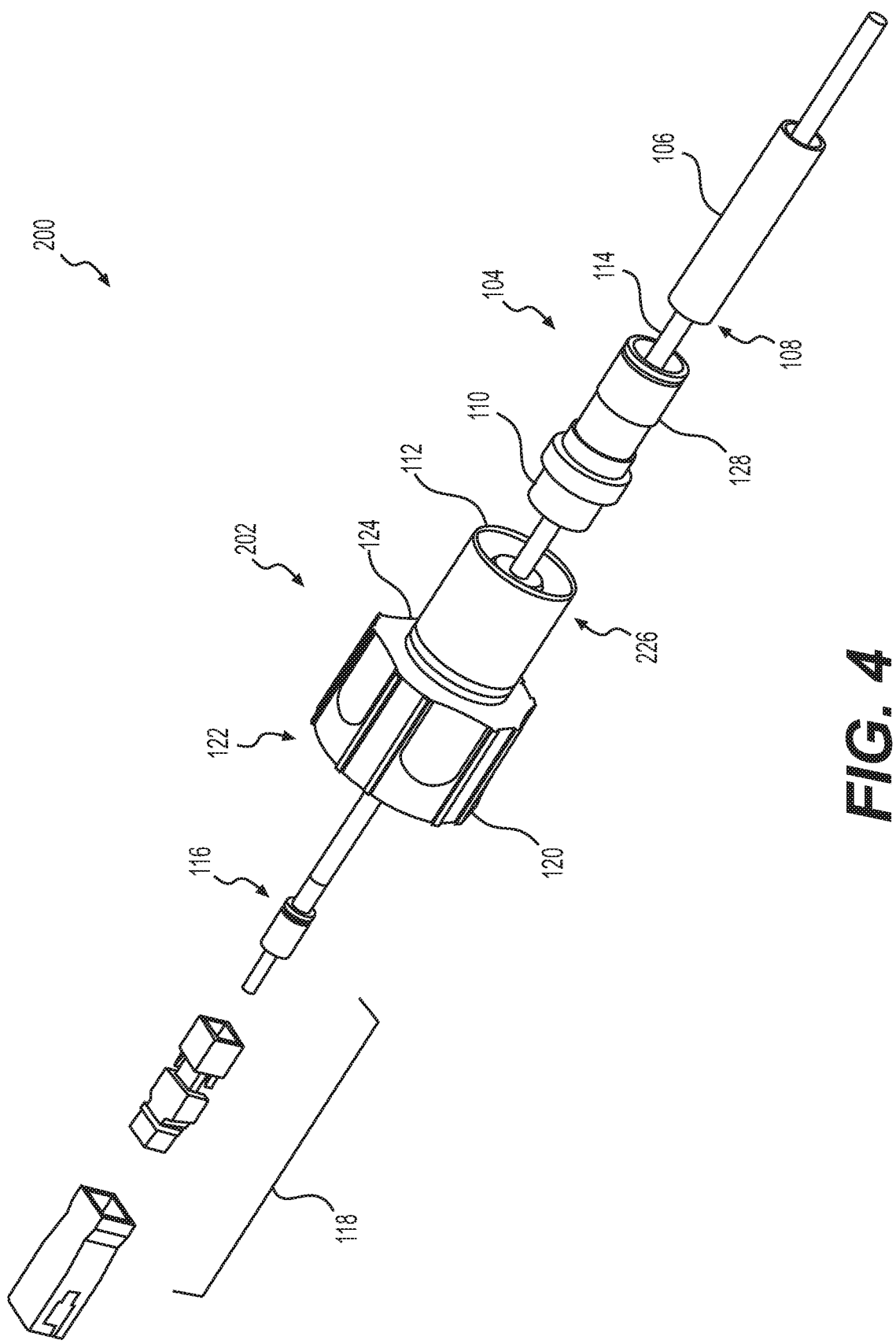
FIG. 4 is a partially-exploded isometric view of another exemplary feed-through connector in accordance with various aspects of the disclosure.
Figure 5:
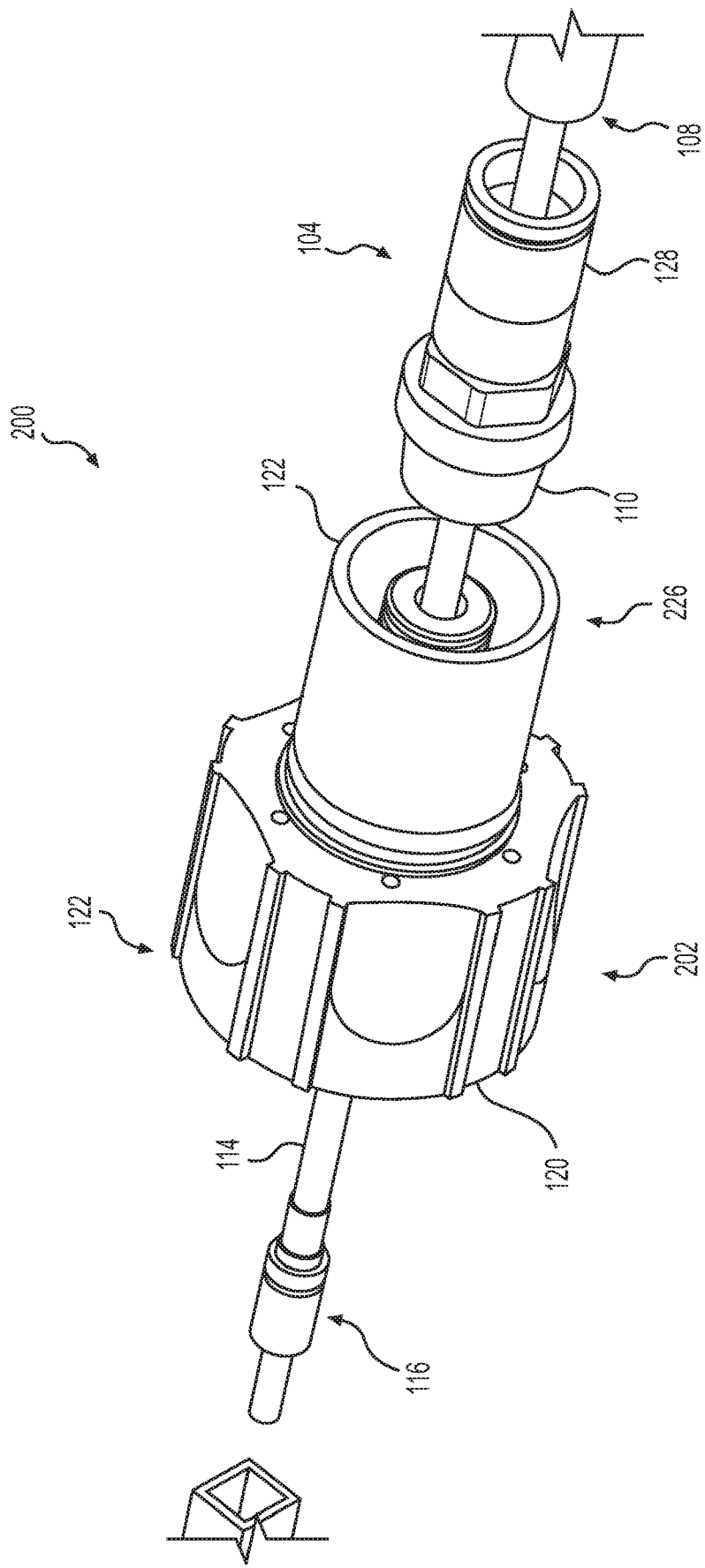
FIG. 5 is an enlarged partially-exploded isometric view of the exemplary feed-through connector of FIG. 4.

Referring to FIGS. 4 and 5, in some embodiments, a connector 200 according to the disclosure may include a connector housing 202, for example, a weatherized or "ruggedized" housing, and the cable connector 104 described above, may include a weatherized, or "ruggedized," The connector housing 202 may be an alternative ODVA-compliant connector, for example, a bayonet-style connector, as would be understood by persons skilled in the art. That is, the connector 200 is similar to the above-described connector 100, but the connector housing 102 is replaced with the connector housing 202. Also, as shown in FIGS. 4 and 5, in some aspects, the male threaded first end 112 of the connector housing 202 may be recessed into a rear portion 226 of the connector housing 202, which may provide an added tamper resistance feature. Of course, the connector housing 102 described above can be similarly modified to provide a recessed male-threaded first end 112.

Figure 6:
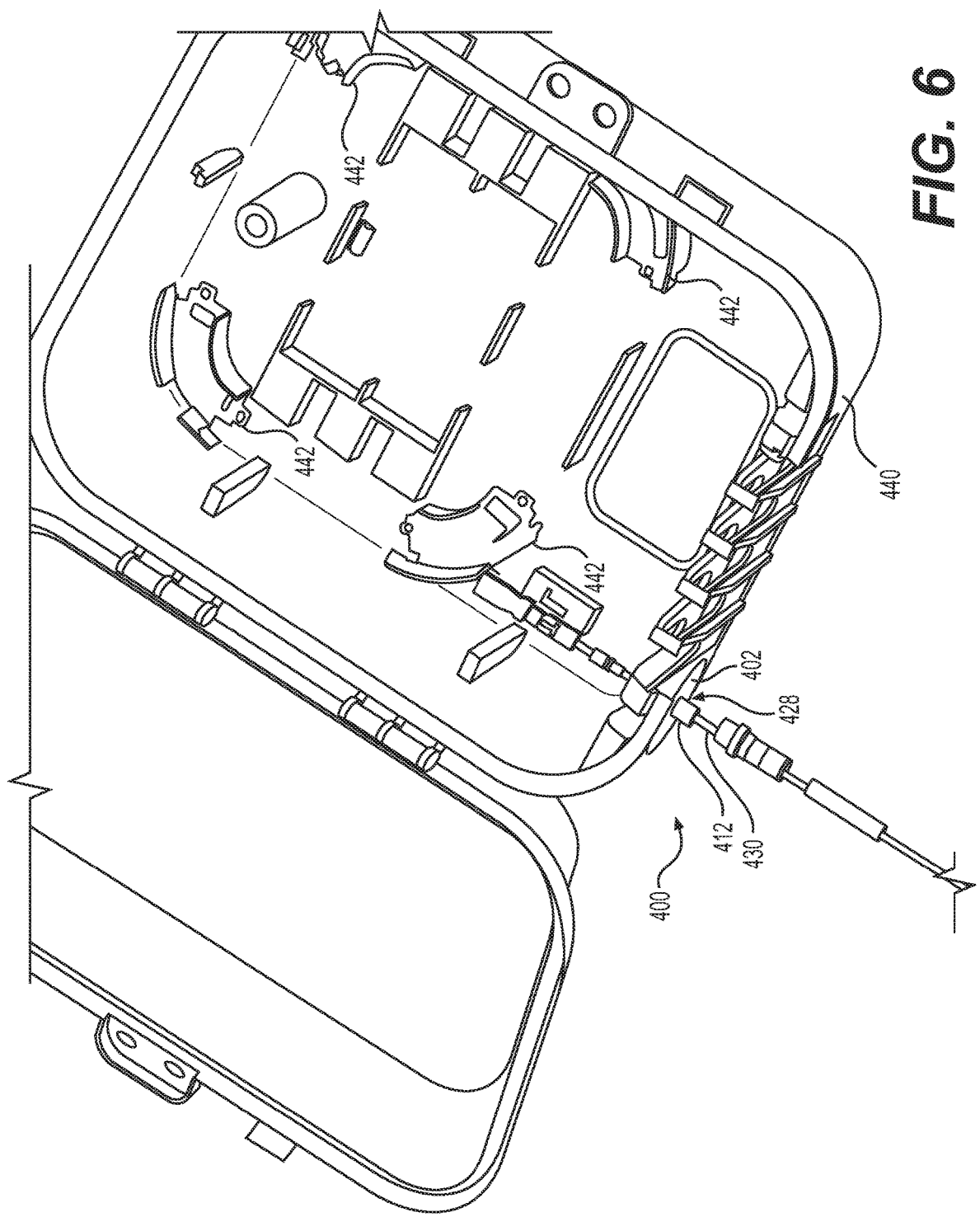
FIG. 6 is a partially-exploded isometric view of an exemplary connection enclosure including a feed-through connector in accordance with various aspects of the disclosure.

Referring now to FIG. 6, an enclosure 440, such as for example a Universal Fiber House Box, may include a connector 400 configured as connector housing portion 402, for example, a weatherized or "ruggedized" housing, having a threaded port 412 to which a cable connector 104 can be attached. The connector housing portion 402 also includes an opening, channel, or feed-through bushing 428 through which a forward portion 430 of the fiber optic cable 114 that extends beyond the cable connector 104 may be fed. As shown in FIG. 4, the enclosure 440 may include guide members 442 for wrapping and storing any excess of the forward portion 430 of the fiber optic cable 114 within the enclosure 440.

Figure 7:
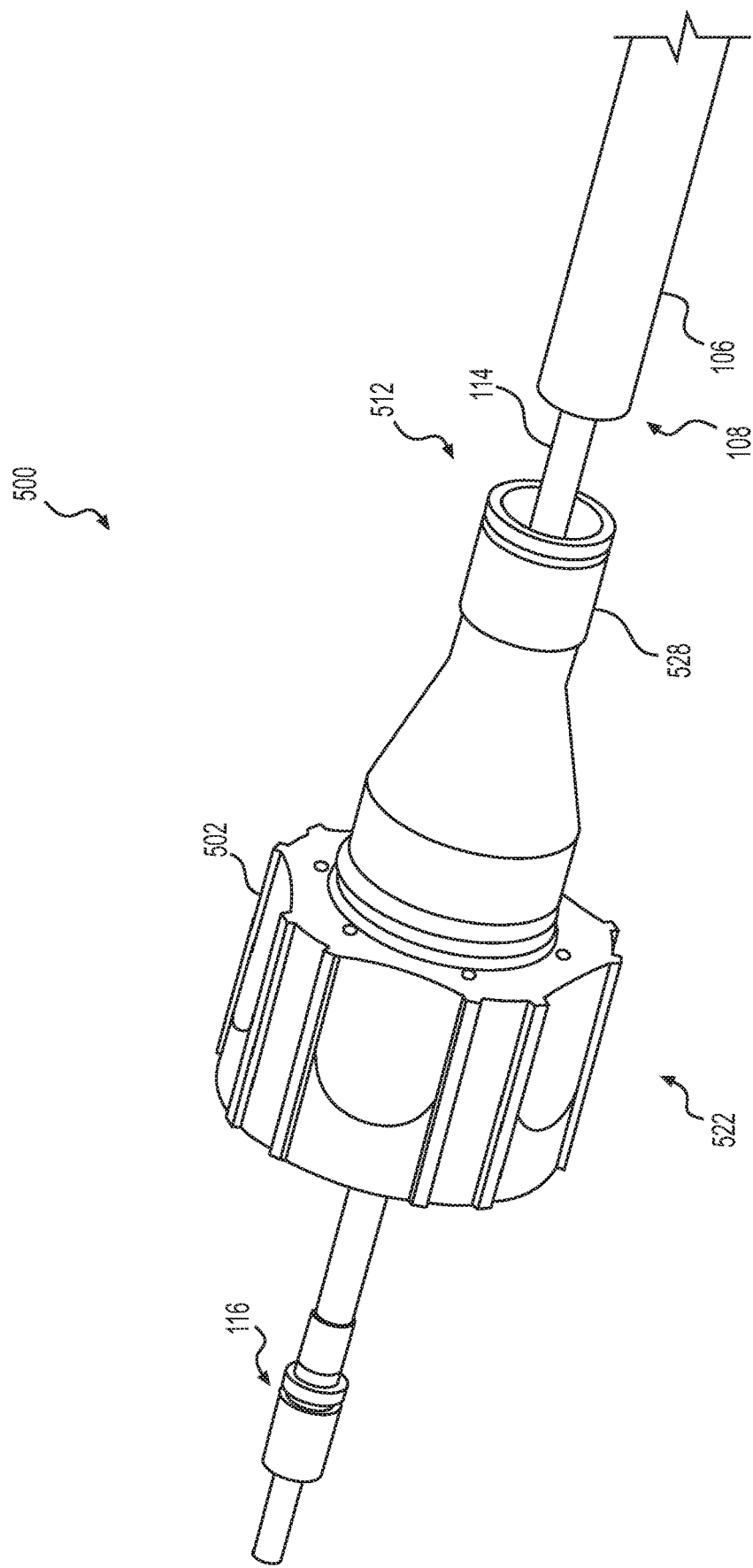
FIG. 7 is an enlarged partially-exploded isometric view of another exemplary feed-through connector in accordance with various aspects of the disclosure.

Referring to FIGS. 7-12, in some aspects, connectors in accordance with the present disclosure may include a connector housing and a cable connector formed as an integral structure of monolithic construction. For example, FIG. 7 shows a feed-through connector 500 that includes a first end 512 having a connector body 524 configured to receive a compression fitting 528 and a second end 522 comprising a connector housing portion 502, for example, a weatherized or "ruggedized" housing. The connector body 524 is configured to receive a free end of a duct 106, and the compression fitting 528 is configured to couple the connector 500 with the duct 106, as described above in connection with the embodiment of FIGS. 1-3. The connector 500 thus provides a direct connection between the duct 106 and the connector housing portion 502, thereby eliminating a possible failure point that would otherwise exist between a separate connector housing and cable connector.

Figure 8:
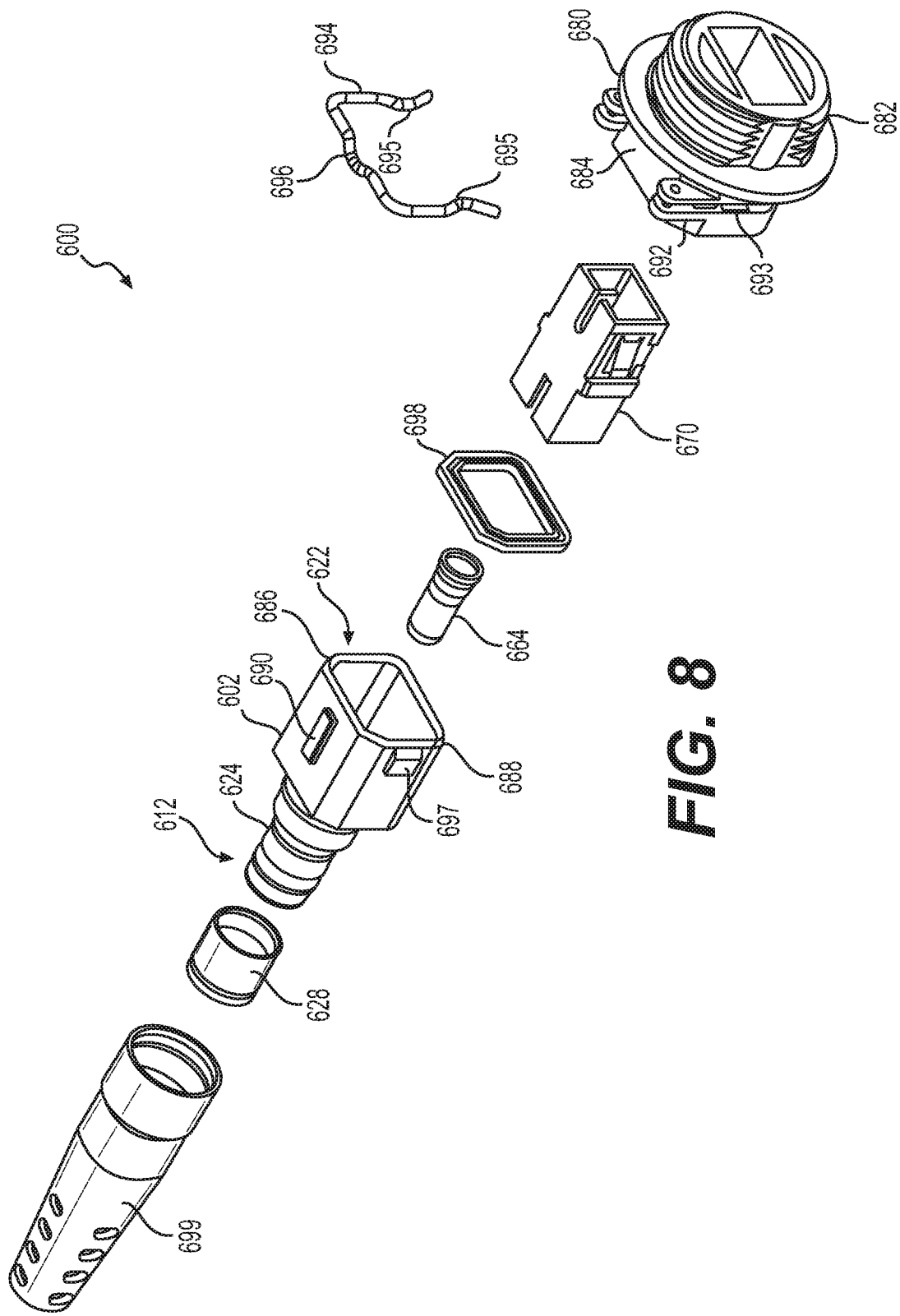
FIG. 8 is an exploded isometric view of another exemplary feed-through connector in accordance with various aspects of the disclosure.

Referring now to FIG. 8, in another embodiment, a feed-through connector 600 may include a connector body 624 at a first end 612 and a connector housing portion 602, for example, a weatherized or "ruggedized" housing, at a second end 622. The connector body 624 may be integrally formed with the connector housing portion 602 as a monolithic structure. A compression fitting 628 is configured to couple the connector 600 with the duct 106. In some aspects, the connector body 624 and the connector housing portion 602 may be separate structures that are assembled together.

The connector body 624 may be configured to receive the compression fitting 628, similar to the embodiment of FIGS. 1-3, The connector may also include a ferrule 664 that is configured to fit into the end 108 of the duct 106 to prevent collapse of the duct 106 when the compression fitting 628 is compressed onto the connector body 624 to connect the connector 600 to the duct 106. The connector 600 thus provides a direct connection between the duct 106 and the connector housing portion 602, thereby eliminating a possible failure point between an otherwise separate connector housing and cable connector. The ferrule 664 may include one or more barbs extending from its outer surface to assist with retention of the duct 106 upon compression of the compression fitting 628 on the connector body 624, as would be understood by persons skilled in the art.

The connector 600 may be coupled with a fiber optic coupler 670 configured to couple two pre-terminated ends of a fiber optic cable 114. For example, the fiber optic coupler 670 may be an SC coupler, an LC coupler, an ST coupler, or the like. The connector housing portion 602 and the fiber optic coupler 670 are configured such that the connector housing portion 602 can receive at least a portion of the fiber optic coupler 670. The connector 600 may further he assembled to a bulkhead 680 configured to be attached to an enclosure (not shown), such as a tap of an FTTH network, a Universal Fiber House Box, or the like. The bulkhead 680 is configured to receive at least a portion of the fiber optic coupler 670. For example, the bulkhead 680 may include a threaded portion 682 that can be inserted through an opening in the enclosure and fixedly attached to the enclosure by, for example, a threaded nut. Of course, any known connection may be employed to attach the bulkhead 680 to the enclosure, and seals may be employed to reduce mechanical stress and prevent moisture from entering the enclosure.

The bulkhead 680 includes a receptacle 684 on a side opposite to the threaded portion 682. The receptacle 684 is sized and configured to receive the connector housing portion 602. The connector 600 includes features to ensure that the connector housing portion 602 is correctly and completely connected with the bulkhead. For example, the connector housing portion 602 includes a rectangular cross-section having two adjacent angled corners 686 and two right-angle corners 688. Also, a top surface of the connector housing portion 602 may include a longitudinal protrusion 690 configured to be received by a groove (not shown) in only an inner surface of the top wall of the bulkhead 680. The angled corners 686 and/or the notch/groove combination provide a connection key between the connector housing portion 602 and the bulkhead 680.

In addition, the bulkhead 680 includes a pair of transverse grooves 692 on opposite sides of the bulkhead 680. The grooves 692 are configured to receive a U-shaped clip 694. The U-shaped clip 694 includes inwardly-kinked portions 695 along the parallel arms of the U-shaped clip 694. The U-shaped clip 694 also includes a bulged portion 696 on the base arm of the clip 694 in between the parallel arms. The grooves 692 in the bulkhead 680 include slits 693 that extend through the side walls of the bulkhead 680. The connector housing portion 602 includes a pair of protrusions 697 on the external surfaces of opposite walls of the connector housing portion 602. The protrusions 697 are substantially aligned with the slits 693 such that when the connector housing portion 602 is fully inserted into the bulkhead 680, the inwardly-kinked portions 695 extend through the slits 693 and engage rear edges of the protrusions 697 to retain the connector housing portion 602 in the bulkhead 680. The connector 600 may include a seal 698 configured to be sandwiched between a front face of the connector housing portion 602 and the bulkhead 680 to provide a weatherproof seal. The connector 600 may also include a strain relief boot 699.

In use, a duct 106, such as a micro-duct, may be cut to or provided with a precise, desired length for a drop cable assembly between two connection points. The duct is inserted into the connector body 624 of the connector 600. A connector 600 is compression-fit to either or both ends 108 of the duct 106 by sliding the compression fitting 628 axially relative to the connector body 624 to compress the connector body 624 onto the duct 106. A pre-terminated fiber optic cable 114 is fed through the duct 106 and to the fiber optic coupler 670. The inwardly-kinked portions 695 of the U-shaped clip 694 cooperate with the protrusions 697 of the connector housing portion 602 to provide feedback to the user as to whether or not the connector housing portion 602 is clipped into the bulkhead 680 without the possibility of being only partially clipped in. By pressing the bulged portion 696 of the U-shaped clip 694, the clip 694 releases the protrusions 697 so that the connector housing portion 602 can be removed from the bulkhead 680.

Figure 9:
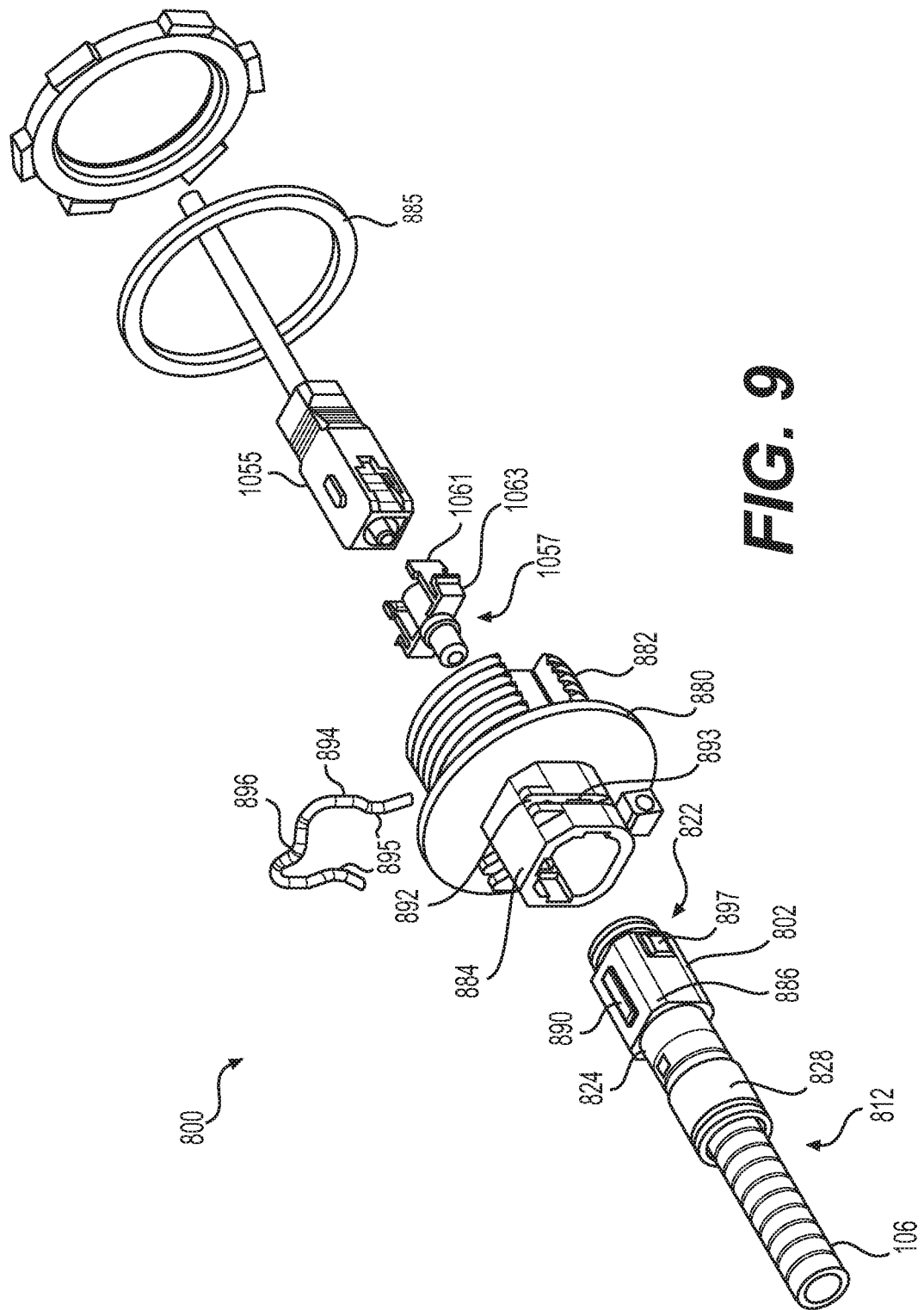
FIG. 9 is an exploded isometric view of an exemplary fiber optic cable connector in accordance with various aspects of the disclosure.
Figure 10:
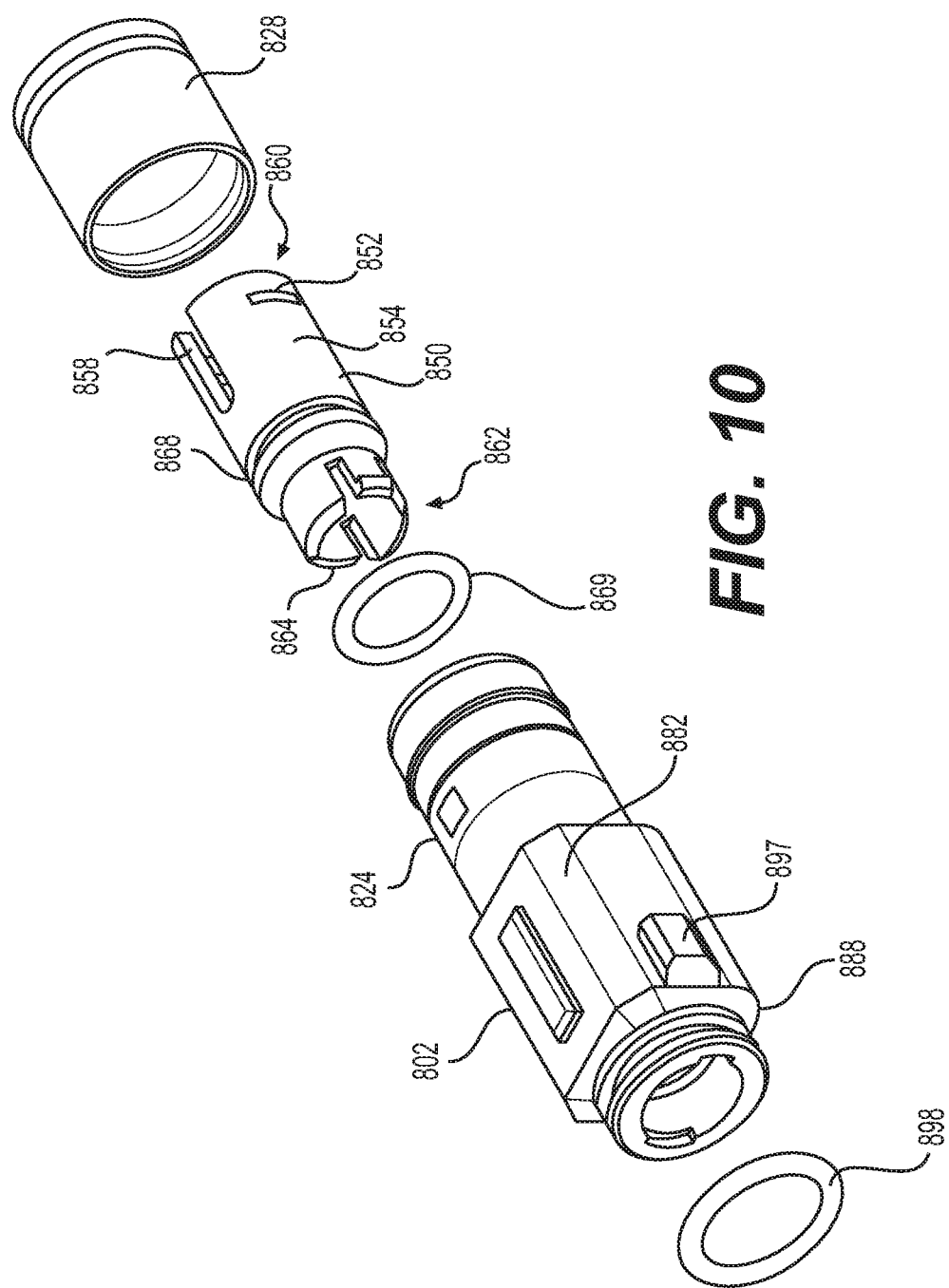
FIG. 10 is an exploded isometric view of a portion of the exemplary fiber optic cable connector of FIG. 9.
Figure 11:
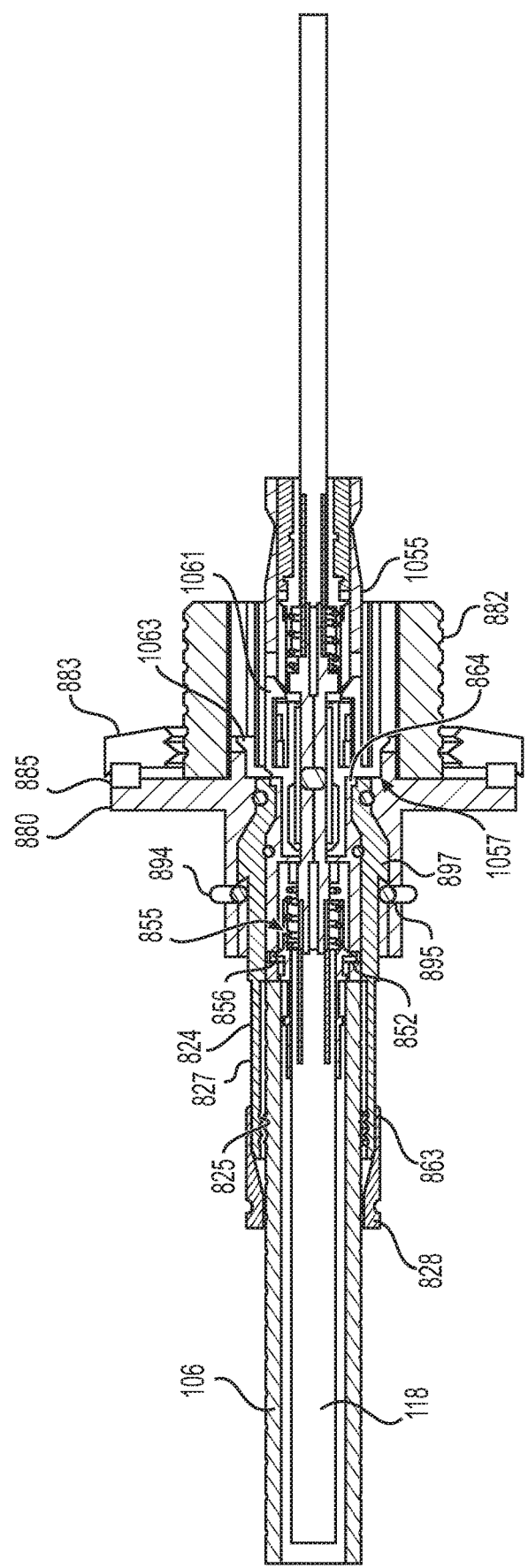
FIG. 11 is a cross-sectional view of the exemplary fiber optic cable connector of FIG. 9 assembled to an exemplary bulkhead.

Referring to FIGS. 9-11, in another embodiment, a fiber optic cable connector 800 may include a connector body 824 at a first end 812 and a connector housing portion 802, for example, a weatherized or "ruggedized" housing, at a second end 822. The connector body 824 may be integrally formed with the connector housing portion 802 as a monolithic structure. A compression fitting 828 is configured to couple the connector 800 with the duct 106. The connector body 824 may be configured to receive the compression fitting 828, similar to the embodiment of FIGS. 1-3. As shown in FIGS. 10 and 11, the first end 862 of the compression fitting 828 may include a circumferential recess 863 (or a series of circumferentially-spaced recesses) configured to receive a first circumferential ridge 825 (or a first series of circumferentially-spaced ridges) on the connector body 824 in the first configuration of the compression fitting 828 so that the compression fitting 828 is latched to the connector body 824. The connector body 824 may include a second circumferential ridge 827 (or a second series of circumferentially-spaced ridges) configured to be received by the circumferential recess 863 of the compression fitting 828 such that the compression fitting 828 remains latched to the connector body 824 in the second configuration of the compression fitting 828.

The connector 800 thus provides a direct connection between the duct 106 and the connector housing portion 802, thereby eliminating a possible failure point between an otherwise separate connector housing and cable connector. In some aspects, the connector body 824 and the connector housing portion 802 may be separate structures that are assembled together.

Referring to FIG. 10, the connector 800 further includes a cylindrical body or basket 850 configured to receive a fiber optic coupler 855, such as an SC coupler, an LC coupler, an ST coupler, or the like. The fiber optic cable 118 may thus be fixed coupled with the connector 800. The basket 850 includes a pair of circumferential slots 852 extending through a wall 854 of the basket 850. The slots 852 may be opposed to one another and sized and arranged to receive corresponding projections 856 from the fiber optic coupler 855 (FIG. 11) in a snap fit configuration. The basket 850 may also include one or more longitudinal slots 858 at a first end 860 that allow the wall 854 of the basket 850 to expand when receiving the fiber optic coupler 855. A second end 862 of the basket 850 may include a plurality of flexible fingers 864 configured to provide a snap fit connection when received by the connector housing portion 802. As shown in FIG. 11, the fingers 864 may be retained by a shoulder 866 extending circumferentially about (or a plurality of shoulder circumferentially spaced apart about) an interior wall of the connector housing portion 802. The basket 850 may include a groove 868 configured to receive an sealing ring 869 to provide a seal between an outer surface of the basket 850 and an inner surface of the connector housing portion 802.

The connector 800 may be assembled to a bulkhead 880 configured to be attached to an enclosure (not shown), such as a tap of an FTTH network, a Universal Fiber House Box, or the like. For example, the bulkhead 880 may include a threaded portion 882 that can be inserted through an opening in the enclosure and fixedly attached to the enclosure by, for example a threaded nut 883. Of course, any known connection may be employed to attach the bulkhead 880 to the enclosure, and a seal 885 may be employed between the nut 883 and the enclosure and/or between the bulkhead 880 and the enclosure to reduce mechanical stress and prevent moisture from entering the enclosure.

The bulkhead 880 includes a receptacle 884 on a side opposite to the threaded portion 882. The receptacle 884 is sized and configured to receive the connector housing portion 802. The connector 800 includes features to ensure that the connector housing portion 802 is correctly and completely connected with the bulkhead 880. For example, the connector housing portion 802 includes a rectangular cross-section having two adjacent angled corners 886 and two right-angle corners 888. Also, a top surface of the connector housing portion 802 may include a longitudinal protrusion 890 configured to be received by a groove (not shown) in only an inner surface of the top wall of the bulkhead 880. The angled corners 886 and/or the notch/groove combination provide a connection key between the connector housing portion 802 and the bulkhead 880.

In addition, the bulkhead 880 includes a pair of transverse grooves 892 on opposite sides of the bulkhead 880. The grooves 892 are configured to receive a U-shaped clip 894. The U-shaped clip 894 includes inwardly-kinked portions 895 along the parallel arms of the U-shaped clip 894. The U-shaped clip 894 also includes a bulged portion 896 on the base arm of the clip 894 in between the parallel arms. The grooves 892 in the bulkhead 880 include slits 893 that extend through the side walls of the bulkhead 880. The connector housing portion 802 includes a pair of protrusions 8970 on the external surfaces of opposite walls of the connector housing portion 802. The protrusions 897 are substantially aligned with the slits 893 such that when the connector housing portion 802 is fully inserted into the bulkhead 880, the inwardly-kinked portions 895 extend through the slits 893 and engage rear edges of the protrusions 897 to retain the connector housing portion 802 in the bulkhead 880. The connector 800 may include a seal 898 configured to be sandwiched between a front face of the connector housing portion 802 and the bulkhead 880 to provide a weatherproof seal.

Referring again to FIG. 9, the fiber optic connector 855 within the connector housing portion 802 may be coupled with a fiber optic connector 1055 by an adaptor 1057 disposed at the enclosure side of the bulkhead 880. The adaptor 1057 may include a first pair of flexible fingers 1061 sized and arranged to couple the adaptor 1057 with the fiber optic connector 1055 and a second pair of flexible fingers 1063 sized and arranged to couple the adaptor 1057 with the bulkhead 880.

In use, a duct 106, such as a micro-duct, may be cut to or provided with a precise, desired length for a drop cable assembly between two connection points. A terminated fiber optic cable 118 is provided with a fiber optic coupler 855, which is coupled with the basket 850, which in turn is coupled with the connector housing portion 802. The duct is inserted into the connector body 824 of the connector 800. A connector 800 is compression-fit to either or both ends 108 of the duct 106 by sliding the compression fitting 828 axially relative to the connector body 824 to compress the connector body 824 onto the duct 106. The inwardly-kinked portions 895 of the U-shaped dip 894 cooperate with the protrusions 897 of the connector housing portion 802 to provide feedback to the user as to whether or not the connector housing portion 802 is clipped into the bulkhead 880 without the possibility of being only partially clipped in. By pressing the bulged portion 896 of the U-shaped clip 894, the clip 894 releases the protrusions 897 so that the connector housing portion 802 can be removed from the bulkhead 880.

Figure 12:
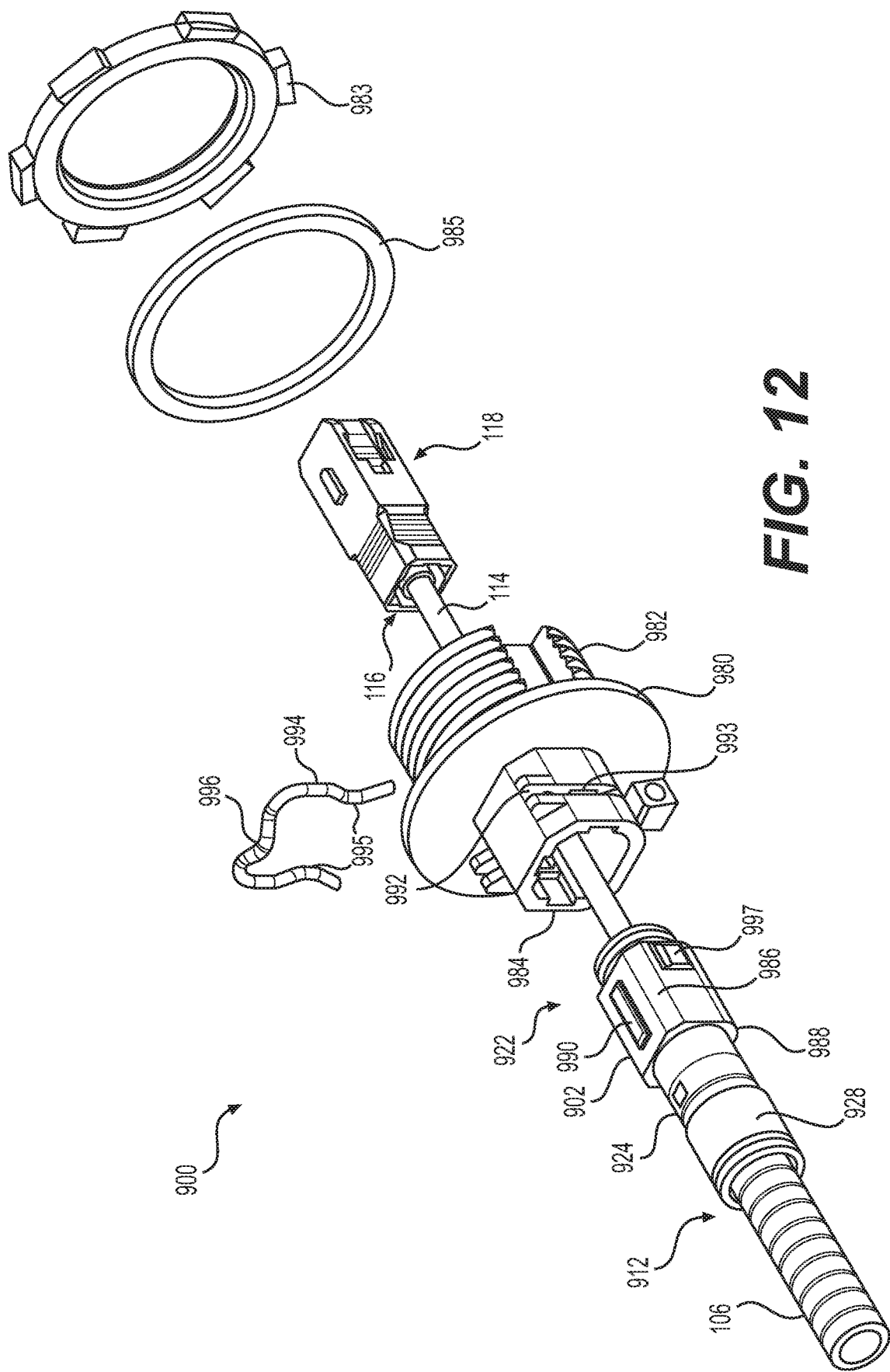
FIG. 12 is an exploded isometric view of another exemplary feed-through connector in accordance with various aspects of the disclosure.

Referring now to FIG. 12, in another embodiment, a feed-through connector 900 may include a connector body 924 at a first end 912 and a connector housing portion 902, for example, a weatherized or "ruggedized" housing, at a second end 922. The connector body 924 may be integrally formed with the connector housing portion 902 as a monolithic structure. A compression fining 928 is configured to couple the connector 900 with the duct 106. The connector body 924 may be configured to receive the compression fitting 928, similar to the embodiment of FIGS. 1-3. The connector 900 thus provides a direct connection between the duct 106 and the connector housing portion 902, thereby eliminating a possible failure point between an otherwise separate connector housing and cable connector. In some aspects, the connector body 924 and the connector housing portion 902 may be separate structures that are assembled together.

Rather than including the basket shown in FIG. 10, the connector 900 provides a passage configured to slidably receive a fiber optic cable in a feed-through manner, similar to the aforementioned fee-through embodiments. The connector 900 may be assembled to a bulkhead 980 configured to be attached to an enclosure (not shown), such as a tap of an FTTH network, a Universal Fiber House Box, or the like. For example, the bulkhead 980 may include a threaded portion 982 that can he inserted through an opening in the enclosure and fixedly attached to the enclosure by, for example a threaded nut 983. Of course, any known connection may be employed to attach the bulkhead 980 to the enclosure, and a seal 985 may be employed between the nut 983 and the enclosure and/or between the bulkhead 980 and the enclosure to reduce mechanical stress and prevent moisture from entering the enclosure.

The bulkhead 980 includes a receptacle 984 on a side opposite to the threaded portion 982. The receptacle 984 is sized and configured to receive the connector housing portion 902. The connector 900 includes features to ensure that the connector housing portion 902 is correctly and completely connected with the bulkhead 980. For example, the connector housing portion 902 includes a rectangular cross-ssection having two adjacent angled corners 986 and two right-angle corners 988. Also, a top surface of the connector housing portion 902 may include a longitudinal protrusion 990 configured to be received by a groove (not shown) in only an inner surface of the top wall of the bulkhead 980.

The angled corners 986 and/or the notch/groove combination provide a connection key between the connector housing portion 902 and the bulkhead 980.

In addition, the bulkhead 980 includes a pair of transverse grooves 992 on opposite sides of the bulkhead 980. The grooves 992 are configured to receive a U-shaped clip 994. The U-shaped clip 994 includes inwardly-kinked portions 995 along the parallel arms of the U-shaped clip 994. The U-shaped clip 994 also includes a bulged portion 996 on the base arm of the clip 994 in between the parallel arms. The grooves 992 in the bulkhead 990 include slits 993 that extend through the side walls of the bulkhead 980. The connector housing portion 902 includes a pair of protrusions 970 on the external surfaces of opposite walls of the connector housing portion 902. The protrusions 997 are substantially aligned with the slits 993 such that when the connector housing portion 902 is fully inserted into the bulkhead 980, the inwardly-kinked portions 995 extend through the slits 993 and engage rear edges of the protrusions 997 to retain the connector housing portion 902 in the bulkhead 980. The connector 900 may include a seal 998 configured to be sandwiched between a front face of the connector housing portion 902 and the bulkhead 980 to provide a weatherproof seal.

After being fed through the connector 900 and the bulkhead 908, an end 116 of the optical fiber 114 can be terminated with an optical fiber connector 118. The optical fiber connector 118 may be an SC connector, an LC connector, an ST connector, or the like, which is selected depending upon the connection to be made.

In use, a duct 106, such as a micro-duct, may be cut to or provided with a precise, desired length for a drop cable assembly between two connection points. The duct is inserted into the connector body 924 of the connector 900. A connector 900 is compression-fit to either or both ends 108 of the duct 106 by sliding the compression fitting 928 axially relative to the connector body 924 to compress the connector body 924 onto the duct 106. A pre-terminated fiber optic cable 114 is fed through the duct 106 and to the fiber optic coupler 970. The inwardly-kinked portions 995 of the U-shaped clip 994 cooperate with the protrusions 997 of the connector housing portion 902 to provide feedback to the user as to whether or not the connector housing portion 902 is clipped into the bulkhead 980 without the possibility of being only partially clipped in. By pressing the bulged portion 996 of the U-shaped clip 994, the clip 994 releases the protrusions 997 so that the connector housing portion 902 can be removed from the bulkhead 980.

By using connectors according to the disclosure, the duct can be cut to the precise drop length needed at the time of installation. Once the duct 106 is installed, a pre-terminated fiber optic cable 114 can be fed through the duct 106. Because the duct 106 provides a protective coating, the pre-terminated fiber optic cable 114 can have a smaller diameter relative to conventionally-coated fiber optic cable. The smaller diameter fiber optic cable 114 usable with the connectors 100, 200, 400, 500, 600, 800, 900 disclosed herein is more receptive to bending, and the slack is easier to store.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments. For example, various features of the different embodiments may be used together where appropriate.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An optical fiber feed-through connector for optically coupling a pre-terminated end portion of an optical fiber cable with a non-feed-through optical fiber connector comprising:

a feed-through duct engaging portion configured to move between a first position, where the feed-through duct engaging portion is configured to receive a free end portion of a duct shaped so as to allow a pre-terminated end portion of an optical fiber cable to be slidingly fed through the duct, and a second position, where the feed-through duct engaging portion is configured to be compressed around the free end portion of the duct, the feed-through engaging portion being configured to permit the pre-terminated end portion of the optical fiber cable to be slidingly fed through both the duct and the feed-through duct engaging portion in the first position and the second position; and a feed-through housing portion configured to be operatively coupled to the feed-through duct engaging portion so as to allow the pre-terminated end portion of the optical fiber cable to be slidingly fed through the feed-through housing portion after the pre-terminated end portion of the optical fiber cable has been slidingly fed through both the duct and the feed-through duct engaging portion;

wherein the feed-through duct engaging portion and the feed-through housing portion are configured to allow the pre-terminated end portion of the fiber optical cable to be optically coupled with a non-feed-through optical fiber connector after the pre-terminated end portion of the optical fiber cable has been slidingly fed through the duct, the feed-through duct engaging portion, and the feed-through housing portion;

wherein the non-feed-through optical fiber connector is configured to be optically coupled to the pre-terminated end portion of the optical fiber cable without allowing the pre-terminated end portion of the optical fiber cable to be slidingly fed through the non-feed-through optical fiber connector;

wherein the feed-through duct engaging portion includes a first longitudinal conduit configured to allow the pre-terminated end portion of the optical fiber cable to be slid through the first longitudinal conduit, and the feed-through housing portion includes a second longitudinal conduit configured to allow the pre-terminated end portion of the optical fiber cable to be slid through the second longitudinal conduit;

wherein the feed-through housing portion includes a connection point configured to be coupled to the pre-terminated end portion of the optical fiber cable; and wherein the pre-terminated end portion of the optical fiber cable comprises a first pre-terminated end portion of a first optical fiber cable section, and the non-feed-through optical fiber connector is configured to mate the first pre-terminated end portion of the first optical fiber cable section with a second pre-terminated end portion of a second optical fiber cable section.

2. The optical fiber feed-through connector of claim 1, wherein the feed-through duct engaging portion includes a compression fitting portion configured to inwardly deform a portion of a body member around the free end portion of the micro duct without preventing the pre-terminated end portion of the optical fiber cable from being pushed or pulled through both the duct and the feed-through duct engaging portion during operation of the optical fiber feed-through connector.

3. The optical fiber feed-through connector of claim 1, wherein feed-through duct engaging portion includes a compression fitting portion configured to overlap with an end portion of a body member then the feed-through duct engaging portion moves between the first and second positions.

4. An optical fiber feed-through connector for optically coupling a pre-terminated end portion of an optical fiber cable with a non-feed-through optical fiber connector comprising:

a feed-through duct engaging portion configured to move between a first position, where the feed-through duct engaging portion is configured to receive a free end portion of a duct shaped so as to allow a pre-terminated end portion of an optical fiber cable to be pushed or pulled through the duct, and a second position, where the feed-through duct engaging portion is configured to be compressed around the free end portion of the duct, the feed-through engaging portion being configured to permit the pre-terminated end portion of the optical fiber cable to be slidingly fed through both the duct and the feed-through duct engaging portion in the first position and the second position; and a feed-through housing portion configured to be operatively coupled to the feed-through duct engaging portion so as to allow the pre-terminated end portion of the optical fiber cable to be pushed or pulled through the feed-through housing portion;

wherein the feed-through duct engaging portion includes an inner member that is configured to fit into the free end portion of the duct and prevent the free end portion of the duct from collapsing when the feed-through duct engaging portion is compressed around the free end portion of the duct; and wherein the feed-through duct engaging portion and the feed-through housing portion are configured to allow the pre-terminated end portion of the fiber optical cable to be optically coupled with a non-feed-through optical fiber connector after the pre-terminated end portion of the optical fiber cable has been pushed or pulled through the duct.

5. The optical fiber feed-through connector of claim 4, wherein the non-feed-through optical fiber connector is configured to be optically coupled to the pre-terminated end portion of the optical fiber cable without allowing the pre-terminated end portion of the optical fiber cable to be fed through the non-feed-through optical fiber connector.

6. The optical fiber feed-through connector of claim 4, wherein the non-feed-through optical fiber connector comprises an SC connector, an LC connector, or an ST connector.

7. The optical fiber feed-through connector of claim 4, wherein the feed-through duct engaging portion includes a first longitudinal conduit configured to allow the pre-terminated end portion of the optical fiber cable to be slid through the first longitudinal conduit, and the feed-through housing portion includes a second longitudinal conduit configured to allow the pre-terminated end portion of the optical fiber cable to be slid through the second longitudinal conduit.

8. The optical fiber feed-through connector of claim 4, wherein the feed-through housing portion includes a connection point configured to be coupled to the pre-terminated end portion of the optical fiber cable.

9. The optical fiber feed-through connector of claim 4, wherein the pre-terminated end portion of the optical fiber cable comprises a first pre-terminated end portion of a first optical fiber cable section, and the non-feed-through optical fiber connector is configured to mate the first pre-terminated end portion of the first optical fiber cable section with a second pre-terminated end portion of a second optical fiber cable section.

10. The optical fiber feed-through connector of claim 4, wherein the feed-through duct engaging portion includes a compression fitting portion configured to inwardly deform a portion of a body member around the free end portion of the micro duct without preventing the pre-terminated end portion of the optical fiber cable from being pushed or pulled through both the duct and the feed-through duct engaging portion during operation of the optical fiber feed-through connector.

11. The optical fiber feed-through connector of claim 4, wherein the feed-through duct engaging portion includes a compression fitting portion configured to overlap with an end portion of a body member when the feed-through duct engaging portion moves between the first and second positions.

12. An optical fiber feed-through connector for optically coupling a pre-terminated end portion of an optical fiber cable with a non-feed-through optical fiber connector comprising:

a feed-through duct engaging portion having a body member and a compression fitting portion configured to axially move between a first position, where the feed-through duct engaging portion is configured to receive a free end portion of a duct shaped to allow a pre-terminated end portion of an optical fiber cable to be slidingly fed through the duct, and a second position, where the compression fitting portion is configured to radially compress a portion of the body member around the free end portion of the duct, the feed-through engaging portion being configured to permit the pre-terminated end portion of the optical fiber cable to be slidingly fed through both the duct and the feed-through duct engaging portion in the first position and the second position; and a feed-through housing portion configured to be operatively coupled to the feed-through duct engaging portion so as to allow the pre-terminated end portion of the optical fiber cable to be slidingly fed through the feed-through housing portion;

wherein the feed-through duct engaging portion and the feed-through housing portion are configured to allow the pre-terminated end portion of the fiber optical cable to be optically coupled with a non-feed-through optical fiber connector.

13. The optical fiber feed-through connector of claim 12, wherein the non-feed-through optical fiber connector is configured to he optically coupled to the pre-terminated end portion of the optical fiber cable without allowing the pre-terminated end portion of the optical fiber cable to be slidingly fed through the non-feed-through optical fiber connector.

14. The optical fiber feed-through connector of claim 12, wherein the feed-through duct engaging portion is configured to prevent the free end portion of the duct from collapsing when the compression fitting portion moves between the first position and the second position so as to allow the pre-terminated end portion of an optical fiber cable to be pushed or pulled through the duct when the feed-through duct engaging portion is in the first and second position during operation of the optical fiber feed-through connector.

15. The optical fiber feed-through connector of claim 12, wherein the non-feed-through optical fiber connector comprises an SC connector, an LC connector, or an ST connector.

16. The optical fiber feed-through connector of claim 12, wherein the feed-through duct engaging portion includes a first longitudinal conduit configured to allow the pre-terminated end portion of the optical fiber cable to be slid through the first longitudinal conduit, and the feed-through housing portion includes a second longitudinal conduit configured to allow the pre-terminated end portion of the optical fiber cable to be slid through the second longitudinal conduit.

17. The optical fiber feed-through connector of claim 12, wherein the compression fitting portion is configured to inwardly deform the portion of the body member around the free end portion of the micro duct without preventing the pre-terminated end portion of the optical fiber cable from being pushed or pulled through both the duct and the feed-through duct engaging portion during operation of the optical fiber feed-through connector.

18. The optical fiber feed-through connector of claim 12, wherein the feed-through housing portion includes a connection point configured to be coupled to the pre-terminated end portion of the optical fiber cable.

19. The optical fiber feed-through connector of claim 12, wherein the pre-terminated end portion of the optical fiber cable comprises a first pre-terminated end portion of a first optical fiber cable section, and the non-feed-through optical fiber connector is configured to mate the first pre-terminated end portion of the first optical fiber cable section with a second pre-terminated end portion of a second optical fiber cable section.

20. The optical fiber feed-through connector of claim 12, wherein the compression fitting portion is configured to overlap with an end portion of the body member when the compressing fitting portion axially moves between the first and second positions.

* * * * *